Patented Apr. 1, 1930

1,753,128

UNITED STATES PATENT OFFICE

RALPH H. McKEE, OF NEW YORK, N. Y.

METHOD OF RECOVERING ALKALI

No Drawing.    Application filed October 24, 1924. Serial No. 745,712.

This invention relates to methods of treating calcium containing compounds, and more particularly to a method of burning calcium carbonate sludge.

Calcium carbonate sludge, obtained when sodium carbonate solution is causticized with milk of lime has heretofore been burned in a rotary kiln in which the damp calcium carbonate containing from 30 to 40 per cent of moisture is fed into the cold end of the kiln and the hot, burned lime in small lumps, passes from the hot end of the kiln. This lime is then ready for slaking.

In the present invention, I mix this calcium carbonate sludge with black ash residue from soda pulp mills before burning. When pulp is prepared by cooking wood with a caustic soda solution, a residue of black carbon is obtained in considerable quantities. By mixing this carbon residue known in the industry as "black ash residue" with the calcium carbonate sludge in its natural wet state, the sludge will filter more readily and forms a more granular cake.

In practicing the process, the black ash residue consisting mainly of carbon and containing 1 to 5 per cent sodium carbonate is roughly ground, by passing it between rolls, or in any other desired manner, and is then mixed with the calcium carbonate sludge in its natural state. As stated, the filter cake from the sludge usually contains from 30 to 40 per cent moisture. This mixture is fed to the lime kiln, resulting in a considerable saving of fuel due to the heat produced by the burning of the carbon material. A further advantage of the use of the mixture in place of the calcium carbonate sludge alone is that the sodium carbonate in the black ash residue may also be recovered as caustic soda. Heretofore in common practice this sodium carbonate has been discarded into rivers with this waste carbon. By practicing the process as herein described, the sodium carbonate will be retained with the lime and go to the slakers. After the lime has been slaked, an amount of caustic soda equivalent to the soda ash present in the black ash residue may be recovered therefrom.

By the term "black ash residue" as employed in the specification and claims herein is meant the residue consisting primarily of sodium carbonate and carbon obtained in the well known soda process for making pulp. As will be readily understood by those skilled in the art both this product and the term employed herein for identifying such product are well known in the industry.

While I have described in detail the preferred practice of my process, it is to be understood that the details of procedure may be widely varied without departing from the spirit of the invention or the scope of the subjoined claims.

I claim:

1. A process of the character described which comprises grinding black ash residue, mixing it with calcium carbonate sludge, removing the excess water by filtration, and passing the mixture through a heated zone.

2. A process of the character described which comprises grinding black ash residue, mixing it with calcium carbonate sludge, removing the excess water by filtration, passing the mixture through a heated zone, and recovering the soda ash originally present in the black ash residue as caustic soda.

3. A process of the character described which comprises removing the excess water by filtration from a mixture of black ash residue and calcium carbonate sludge, and passing the resulting product through a heated zone.

4. A process of the character described which comprises removing the excess water by filtration from a mixture of black ash residue and calcium carbonate sludge, passing the resulting product through a heated zone, and recovering the soda ash originally present in the black ash residue as caustic soda.

In testimony whereof, I affix my signature.

RALPH H. McKEE.